United States Patent
Kim et al.

(10) Patent No.: US 10,191,507 B1
(45) Date of Patent: Jan. 29, 2019

(54) TEMPERATURE SENSOR USING PROPORTIONAL TO ABSOLUTE TEMPERATURE SENSING AND COMPLEMENTARY TO ABSOLUTE TEMPERATURE SENSING AND ELECTRONIC DEVICE INCLUDING THE SAME

(71) Applicant: Samsung Electronics Co., Ltd., Suwon-si (KR)

(72) Inventors: Taewan Kim, Suwon-si (KR); Chung Yiu Lau, San Jose, CA (US)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/821,102

(22) Filed: Nov. 22, 2017

(51) Int. Cl.
  G05F 3/16 (2006.01)
  G05F 1/46 (2006.01)
  G05F 3/26 (2006.01)
  G05F 3/24 (2006.01)
  G05F 3/30 (2006.01)

(52) U.S. Cl.
  CPC ............... G05F 3/16 (2013.01); G05F 1/463 (2013.01); *G05F 3/245* (2013.01); *G05F 3/267* (2013.01); *G05F 3/30* (2013.01)

(58) Field of Classification Search
  CPC ... G05F 3/16; G05F 3/30; G05F 3/245; G05F 3/267; G05F 1/462; G05F 1/463
  See application file for complete search history.

(56) References Cited

U.S. PATENT DOCUMENTS

| | | |
|---|---|---|
| 6,642,699 B1 | 11/2003 | Gregore, Jr. |
| 7,543,253 B2 | 6/2009 | Marinca et al. |
| 7,696,909 B2 | 4/2010 | Oberhuber |
| 8,358,119 B2 | 1/2013 | Kim |
| 8,803,588 B2 | 8/2014 | Nguyen |
| 9,411,354 B2 | 8/2016 | Hu et al. |
| 9,525,424 B2 | 12/2016 | Tung |
| 2009/0051341 A1 | 2/2009 | Chang et al. |
| 2012/0043955 A1* | 2/2012 | Hu ............................ G05F 3/30 323/313 |
| 2016/0265983 A1 | 9/2016 | Hsu et al. |
| 2016/0363487 A1 | 12/2016 | Sakano |
| 2017/0307451 A1* | 10/2017 | Goumballa ............. G05F 3/267 |

* cited by examiner

*Primary Examiner* — Jue Zhang
*Assistant Examiner* — Jye-June Lee
(74) *Attorney, Agent, or Firm* — Muir Patent Law, PLLC

(57) ABSTRACT

An electronic device may include first through fourth current generators. The first current generator may be configured to output first and second mirroring currents. The second current generator may be configured to output third and fourth mirroring currents. The third current generator may be configured to generate a fifth mirroring current having a current slope proportional to a current slope of the first mirroring current and output a first current having a level of a value obtained by subtracting a level of the fifth mirroring current from a level of the second mirroring current. The fourth current generator may be configured to generate a sixth mirroring current having a current slope proportional to a current slope of the fourth mirroring current and output a second current having a level of a value obtained by subtracting a level of the sixth mirroring current from a level of the third mirroring current.

20 Claims, 6 Drawing Sheets

TEMPERATURE SENSOR USING PROPORTIONAL TO ABSOLUTE TEMPERATURE SENSING AND COMPLEMENTARY TO ABSOLUTE TEMPERATURE SENSING AND ELECTRONIC DEVICE INCLUDING THE SAME

BACKGROUND

Embodiments of the present disclosure disclosed herein relate to an electronic circuit, and more particularly, relate to an electronic circuit included in a temperature sensor.

A mobile device includes various semiconductor chips. An operating temperature of the mobile device increases due to heat generated from other devices located around the mobile device, as well as heat generated by operations of the semiconductor chips. The performance of the semiconductor chips greatly decreases as the operating temperature of the mobile device increases.

The mobile device may include a temperature sensor for sensing an internal temperature. The temperature sensor detects a temperature of the mobile device and outputs a signal associated with the detected temperature. To output the signal associated with the temperature, the temperature sensor may generate a voltage and/or a current associated with the temperature. To generate the temperature-associated voltage and/or current, the temperature sensor may include electronic circuits having operation characteristics according to a temperature.

The temperature sensor of the mobile device may consume power for the purpose of detecting a temperature. Also, the temperature sensor may be disposed on a chip in the mobile device. As the size of the mobile device becomes smaller, nowadays, there is a need for a temperature sensor that consumes less power and occupies a smaller area.

SUMMARY

Embodiments of the present disclosure provide an electronic circuit for configuring a temperature sensor capable of consuming less power and being disposed in a smaller area. The electronic circuit may be included in an electronic device.

According to an aspect of an example embodiment, an electronic device may include a first current generator, a second current generator, a third current generator, and a fourth current generator. The first current generator may output a first mirroring current having a current slope proportional to a current slope of a first reference current and a second mirroring current having a current slope proportional to a current slope of a second reference current. The second current generator may output a third mirroring current having a current slope proportional to the current slope of the first reference current and a fourth mirroring current having a current slope proportional to the current slope of the second reference current. The third current generator may include a first current mirror configured to generate a fifth mirroring current having a current slope proportional to the current slope of the first mirroring current, the third current generator being configured to output a first current having a level of a value obtained by subtracting a level of the fifth mirroring current from the level of the second mirroring current. The fourth current generator may include a second current mirror configured to generate a sixth mirroring current having a current slope proportional to the current slope of the fourth mirroring current, the fourth current generator being configured to output a second current having a level of a value obtained by subtracting the level of the sixth mirroring current from the level of the third mirroring current.

According to an aspect of an example embodiment, an electronic device may include a first current generator, a second current generator, and a third current generator. The first current generator may be configured to generate a first reference current and a second reference current. The second current generator may include a first current mirror configured to generate a first mirroring current having a current slope proportional to a current slope of the first reference current with respect to a temperature variation. The second current generator may also be configured to output a first current having a level of a value obtained by subtracting a level of the first mirroring current from a level of the second reference current. The third current generator may include a second current mirror configured to generate a second mirroring current having a current slope proportional to the current slope of the second reference current with respect to a temperature variation. The third current generator may also be configured to output a second current having a level of a value obtained by subtracting a level of the second mirroring current from a level of the first reference current.

According to an aspect of an example embodiment, an electronic device may include a reference current generator and a current slope generator. The reference current generator may be configured to generate a first reference current and a second reference current having a current level proportional to a temperature. The current slope generator may be configured to, with respect to a temperature variation, generate a first mirroring current having a current slope proportional to a current slope of the first reference current and a second mirroring current having a current slope proportional to the current slope of the second reference current, generate a third mirroring current having a current slope proportional to the current slope of the first mirroring current, output a first current having a level of a value obtained by subtracting a level of the third mirroring current from a level of the second mirroring current, generate a fourth mirroring current having a current slope proportional to the current slope of the second mirroring current, and output a second current having a level of a value obtained by subtracting a level of the fourth mirroring current from a level of the first mirroring current.

BRIEF DESCRIPTION OF THE FIGURES

Embodiments of the present disclosure will be more clearly understood from the following detailed description taken in conjunction with the accompanying drawings in which.

DETAILED DESCRIPTION

Below, embodiments of the present disclosure may be described in detail and clearly to such an extent that an ordinary one in the art easily implements the inventive concept.

Figure 1:
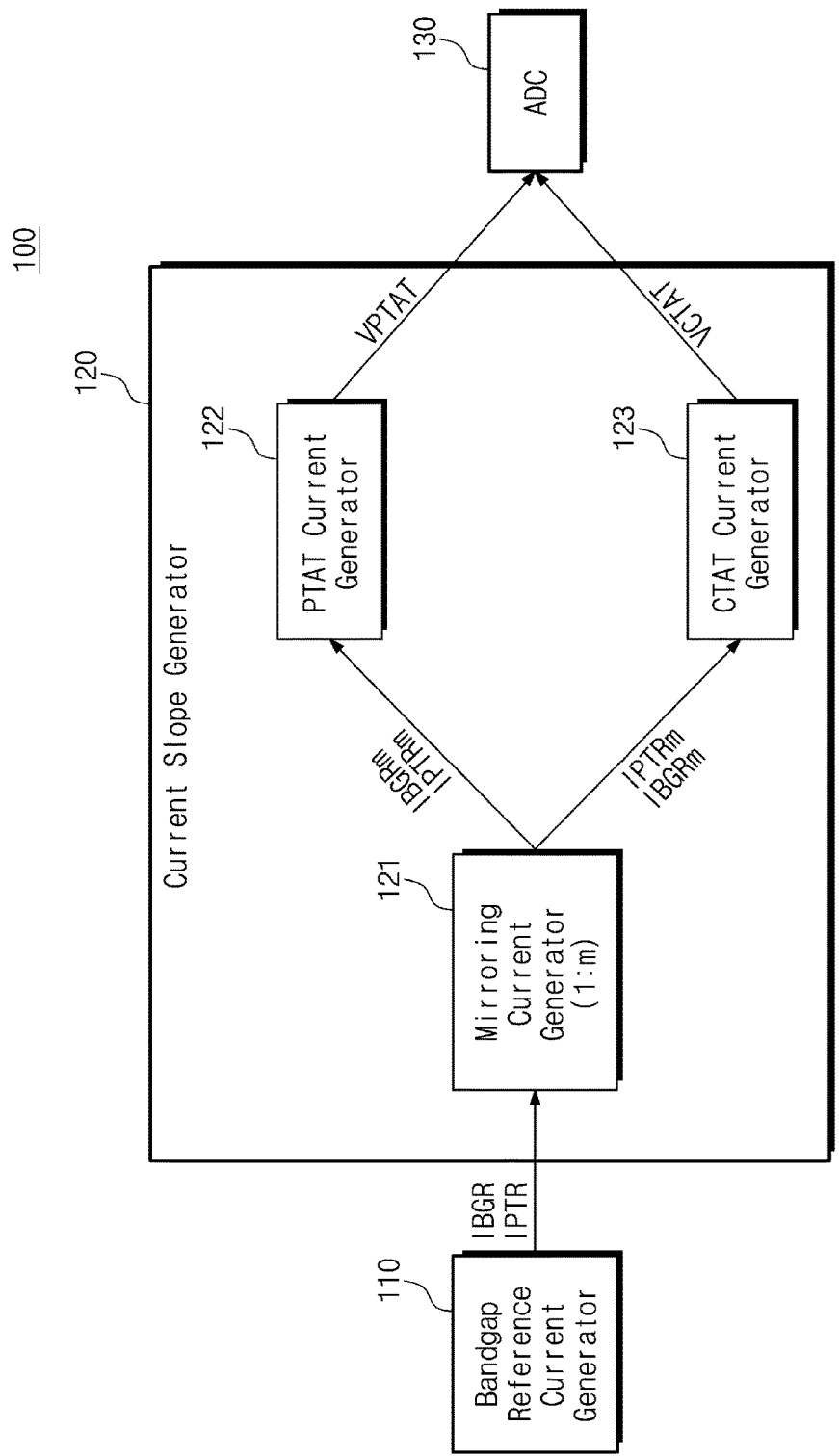
FIG. 1 is a block diagram illustrating an exemplary temperature sensor according to an embodiment of the inventive concept.

FIG. 1 is a block diagram illustrating an exemplary temperature sensor according to an embodiment of the inventive concept.

Referring to FIG. 1, a temperature sensor 100 may include a bandgap reference current generator 110, a current slope generator 120, and an analog to digital converter (ADC) 130. The current slope generator 120 may include a mirroring current generator 121, a proportional to absolute temperature (PTAT) current generator 122, a complementary to absolute temperature (CTAT) current generator 123.

The bandgap reference current generator 110 may generate a bandgap reference current IBGR and a temperature proportional reference current IPTR. The bandgap reference current generator 110 may output the bandgap reference current IBGR and the temperature proportional reference current IPTR to the mirroring current generator 121.

A current that is output by an electronic circuit or the like may include a current component having a level proportional to a temperature and a current component having a level inversely proportional to a temperature. The temperature disclosed herein may be an operating temperature of the electronic circuit, an electronic device, a memory device, a semiconductor device, a memory system, a memory module, etc. In the case where the current output by the electronic circuit includes the current component having the level proportional to a temperature and the current component having the level inversely proportional to a temperature with a specific ratio. A level of the current output by the electronic circuit may be substantially uniform and independent of a temperature variation. Terms such as "same," "uniform," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. For example, items described as "substantially the same," "substantially equal," or "substantially planar," may be exactly the same, equal, or planar, or may be the same, equal, or planar within acceptable variations that may occur, for example, due to manufacturing processes. Alternatively, the level of the current output by the electronic circuit may be proportional to a temperature. Accordingly, a designer may adjust a ratio of a current component having a level proportional to a temperature to a current component having a level inversely proportional to a temperature and may design an electronic circuit for outputting a current associated with a temperature.

An electronic device may include an electronic circuit. As used herein, an electronic device may refer, for example, to a device such as a semiconductor chip (e.g., memory chip and/or logic chip formed from a wafer), a stack of semiconductor chips, a semiconductor package including one or more semiconductor chips stacked on a package substrate, or a package-on-package device including a plurality of packages. The electronic device may also include products that include these devices, such as a memory card, a memory module, a hard drive including additional components, a mobile phone, laptop, tablet, desktop, camera, server, computing system, or other consumer electronic device, etc.

The bandgap reference current IBGR and the temperature proportional reference current IPTR may be output by an electronic circuit or the like of the bandgap reference current generator 110. For example, by adjusting a ratio of a current component having a level proportional to a temperature to a current component having a level inversely proportional to a temperature, a designer may design the bandgap reference current generator 110 for outputting the bandgap reference current IBGR and the temperature proportional reference current IPTR. In an example of FIG. 1, a current slope of the bandgap reference current IBGR may be horizontal, such that the current level is substantially uniform with respect to changes in temperature, and therefore independent of a temperature variation. A level of temperature proportional reference current IPTR may be proportional to a temperature (e.g., the change in IPTR with respect to change in temperature may have a constant slope greater than zero).

Even though the bandgap reference current generator 110 is configured to output the bandgap reference current IBGR having a uniform level independent of a temperature variation, in some embodiments, a level of the bandgap reference current IBGR may substantially finely vary depending on a temperature variation (e.g., the change in IBGR with respect to change in temperature may have a slope of substantially zero). In an example embodiment, a temperature may be an operating temperature of an electronic device including the temperature sensor 100 (refer to FIG. 8).

The bandgap reference current IBGR and temperature proportional reference current IPTR may be reference currents used to generate different currents associated with a temperature. The temperature sensor 100 may cause different currents to be generated, each current having a uniform level independent of a temperature variation, based on the bandgap reference current IBGR. Alternatively, the temperature sensor 100 may cause different currents to be generated, each current having a level proportional to a temperature, based on the temperature proportional reference current IPTR. Below, in this specification, a reference current may mean a reference current used to generate another current. Below, the process in which different currents are generated based on the bandgap reference current IBGR and the temperature proportional reference current IPTR will be described.

The mirroring current generator 121 may receive the bandgap reference current IBGR and the temperature proportional reference current IPTR from the bandgap reference current generator 110. The mirroring current generator 121 may generate a current IBGRm mirrored by a ratio of m times, based on the bandgap reference current IBGR. Also, the mirroring current generator 121 may generate a current IPTRm mirrored by a ratio of m times, based on the temperature proportional reference current IPTR. A mirroring ratio of the mirroring current generator 121 may be "1:m". In this specification, the mirroring ratio may mean a ratio of a current input to an electronic circuit including a current mirror circuit to a current output from the electronic circuit including the current mirror circuit. The "m" disclosed herein, may be a positive integer greater than 1.

For example, in the case where "m" is 1, the mirroring current generator 121 may output the current IBGRm, which has substantially the same level as a level of the bandgap reference current IBGR, to the PTAT current generator 122 and the CTAT current generator 123. Also, the mirroring current generator 121 may output the current IPTRm, which has substantially the same level as a level of the temperature proportional reference current IPTR, to the PTAT current generator 122 and the CTAT current generator 123.

Since a level of the bandgap reference current IBGR is substantially uniform independent of a temperature variation, a current slope of the current IBGRm may be substantially zero and a level of the current IBGRm may be independent of a temperature variation. Since a level of the temperature proportional reference current IPTR is proportional to a temperature, a level of the current IPTRm may be proportional to a temperature.

Since a level current slope of the current IPTRm is proportional to a temperature, a current slope of the current IPTRm may have the rate of change with respect to temperature. Also, since a current slope of the current IPTRm varies depending on the mirroring ratio "1:m", the rate of change of the level of the current IPTRm with respect to temperature may vary depending on the mirroring ratio "1:m". For example, the rate of change of the current IPTRm with respect to temperature may be m times the rate of change of the temperature proportional reference current IPTR with respect to temperature.

The mirroring current generator 121 may include an electronic circuit such as a current mirror circuit for the purpose of mirroring the bandgap reference current IBGR and the temperature proportional reference current IPTR. The current mirror circuit may output the mirrored currents IBGRm and IPTRm. The mirroring current generator 121 may output the current IBGRm and the current IPTRm to the PTAT current generator 122 and the CTAT current generator 123.

The PTAT current generator 122 may receive the current IBGRm and the current IPTRm from the mirroring current generator 121. The PTAT current generator 122 may generate a PTAT current having a level proportional to a temperature, based on the current IBGRm and the current IPTRm. The PTAT current generator 122 may use the current IBGRm and the current IPTRm as a reference current.

The PTAT current generator 122 may generate a PTAT voltage VPTAT having a level proportional to a level of the PTAT current. Since a level of the PTAT current is proportional to a temperature, a level of the PTAT voltage VPTAT may also be proportional to a temperature. The process in which the PTAT current generator 122 generates the PTAT current and the PTAT voltage VPTAT will be more specifically described with reference to FIGS. 3 and 4.

The CTAT current generator 123 may receive the current IBGRm and the current IPTRm from the mirroring current generator 121. The CTAT current generator 123 may generate a CTAT current having a level inversely proportional to a temperature, based on the current IBGRm and the current IPTRm. The CTAT current generator 123 may use the current IBGRm and the current IPTRm as a reference current. Also, the CTAT current generator 123 may generate a CTAT voltage VCTAT having a level proportional to a level of the CTAT current. Since a level of the CTAT current is inversely proportional to a temperature, a level of the CTAT voltage CTAT may also be inversely proportional to a temperature. The process in which the CTAT current generator 123 generates the CTAT current and the CTAT voltage VCTAT will be more specifically described with reference to FIGS. 3 and 4.

In an example of FIG. 1, levels of the current IBGRm and the current IPTRm may be proportional to "m". A level of the PTAT current and a level of the CTAT current may be proportional to "m". Also, a level of the PTAT current may be proportional to a temperature, and a level of the CTAT current may be inversely proportional to a temperature. Accordingly, the rate of change of a level of the PTAT current with respect to temperature may be proportional to "m", and the rate of change of a level of the CTAT current with respect to temperature may be inversely proportional to "m". Also, the rate of change of a level of the PTAT current with respect to temperature may be proportional to the rate of change of a level of the current IPTRm with respect to temperature. The rate of change of a level of the CTAT current with respect to temperature may be proportional to the rate of change of a level of the current IPTRm with respect to temperature.

A level of the PTAT voltage VPTAT may be proportional to a level of the PTAT current, and a level of the CTAT voltage VCTAT may be proportional to a level of the CTAT current. The rate of change of a level of the PTAT voltage VPTAT with respect to temperature may be proportional to "m", and the rate of change of a level of the CTAT voltage VCTAT with respect to temperature may be inversely proportional to "m".

A designer may design the current slope generator 120 so as to generate the PTAT current, the PTAT voltage VPTAT, the CTAT current, and the CTAT voltage VCTAT having the various rates of change with respect to temperature through various setting of the mirroring ratio "1:m".

The ADC 130 may receive the PTAT voltage VPTAT from the PTAT current generator 122. Also, the ADC 130 may receive the CTAT voltage VCTAT from the CTAT current generator 123. The ADC 130 may generate code values based on the PTAT voltage VPTAT and the CTAT voltage VCTAT. Below, in this specification, a code value may mean a digital value corresponding to specific analog signals (e.g., a current and a voltage).

The ADC 130 may generate a code value corresponding to a difference between a level of the PTAT voltage VPTAT and a level of the CTAT voltage VCTAT. For example, the ADC 130 may generate a voltage having a level that is obtained by subtracting a level of the CTAT voltage VCTAT from of a level of the PTAT voltage VPTAT. The ADC 130 may generate a code value corresponding to a difference between a level of the PTAT voltage VPTAT and a level of the CTAT voltage VCTAT, based on the generated voltage. Since a level of the PTAT voltage VPTAT is proportional to a temperature and a level of the CTAT voltage VCTAT is inversely proportional to a temperature, code values generated in the ADC 130 may be proportional to a temperature.

Figure 8:
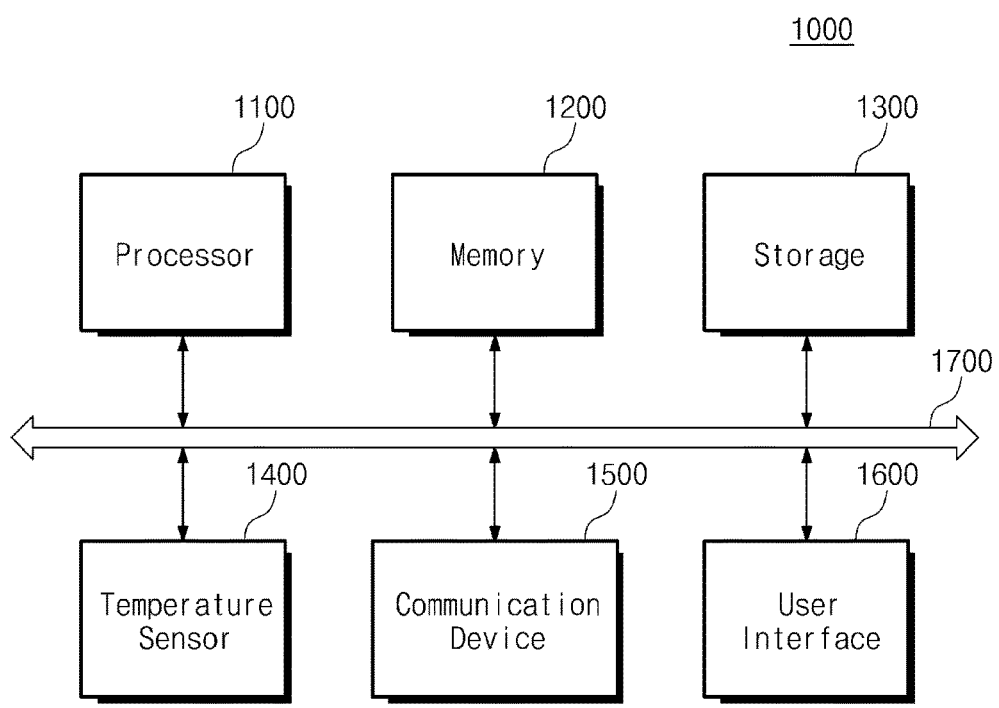
FIG. 8 is a block diagram illustrating an exemplary electronic device including the temperature sensor of FIG. 1 according to example embodiments.

An electronic device including the temperature sensor 100 may calculate a temperature of the electronic device based on code values generated from the ADC 130 by a processor and may control the electronic device based on the calculated temperature (refer to FIG. 8).

Figure 2:
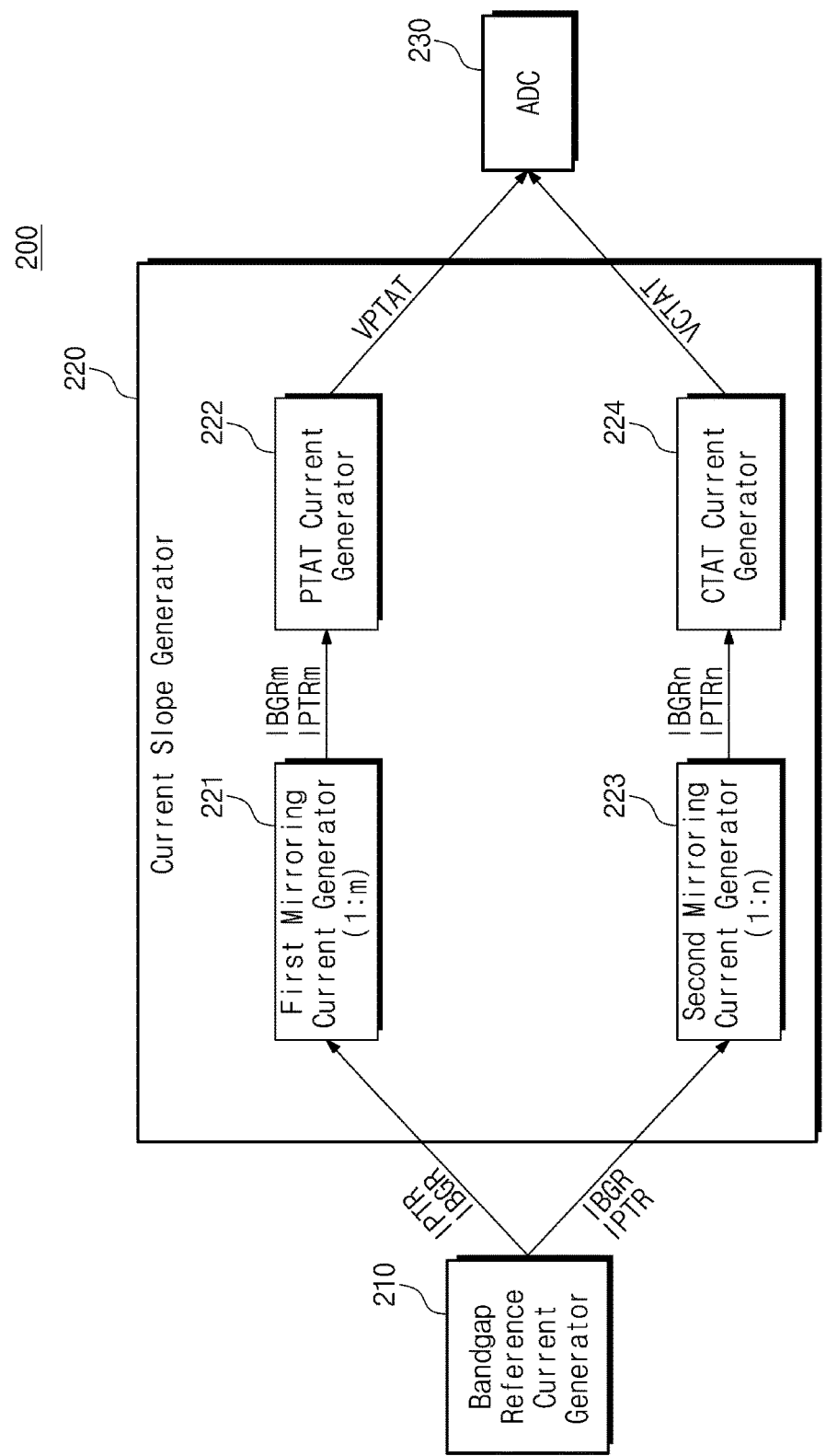
FIG. 2 is a block diagram illustrating an exemplary temperature sensor according to an embodiment of the inventive concept.

FIG. 2 is a block diagram illustrating an exemplary temperature sensor according to an embodiment of the inventive concept.

Referring to a temperature sensor 200 of FIG. 2 and the temperature sensor 100 of FIG. 1, the temperature sensor 200 may include a first mirroring current generator 221 and a second mirroring current generator 223 instead of the mirroring current generator 121.

The first mirroring current generator 221 may receive the bandgap reference current IBGR and the temperature proportional reference current IPTR from a bandgap reference current generator 210. The first mirroring current generator 221 may generate a current IBGRm mirrored by a ratio of m times, based on the bandgap reference current IBGR. Also, the first mirroring current generator 221 may generate a current IPTRm mirrored by a ratio of m times, based on the temperature proportional reference current IPTR. For example, a mirroring ratio of the first mirroring current generator 221 may be "1:m".

The first mirroring current generator 221 may include an electronic circuit such as a current mirror circuit for the purpose of mirroring the bandgap reference current IBGR and the temperature proportional reference current IPTR. The current mirror circuit may output the currents IBGRm and IPTRm. The first mirroring current generator 221 may output the current IBGRm and the current IPTRm to a PTAT current generator 222.

For example, in the case where "m" is 1, the first mirroring current generator 221 may output the current IBGRm, which has substantially the same level as a level of the bandgap reference current IBGR, to the PTAT current generator 222. Also, the first mirroring current generator 221 may output the current IPTRm, which has substantially the same level as a level of the temperature proportional reference current IPTR, to the PTAT current generator 222.

The second mirroring current generator 223 may receive the bandgap reference current IBGR and the temperature proportional reference current IPTR from the bandgap reference current generator 210. The second mirroring current generator 223 may generate a current IBGRn mirrored by a ratio of n times, based on the bandgap reference current IBGR. The "n" disclosed herein, may be a positive integer greater than 1. Also, the second mirroring current generator 223 may generate a current IPTRn mirrored by a ratio of n times, based on the temperature proportional reference current IPTR. For example, a mirroring ratio of the second mirroring current generator 223 may be "1:n".

The second mirroring current generator 223 may include an electronic circuit such as a current mirror circuit for the purpose of mirroring the bandgap reference current IBGR and the temperature proportional reference current IPTR. The current mirror circuit may output the currents IBGRn and IPTRn. The second mirroring current generator 223 may output the current IBGRn and the current IPTRn to a CTAT current generator 224.

For example, in the case where "n" is 1, the second mirroring current generator 223 may output the current IBGRn, which has substantially the same level as a level of the bandgap reference current IBGR, to the CTAT current generator 224. Also, the second mirroring current generator 223 may output the current IPTRn, which has substantially the same level as a level of the temperature proportional reference current IPTR, to the CTAT current generator 224.

The PTAT current generator 222 may receive the current IBGRm and the current IPTRm from the first mirroring current generator 221. The PTAT current generator 222 may generate a PTAT current having a level proportional to a temperature, based on the current IBGRm and the current IPTRm. The PTAT current generator 222 may use the current IBGRm and the current IPTRm as a reference current.

The PTAT current generator 222 may generate a PTAT voltage VPTAT having a level proportional to a level of the PTAT current. Since a level of the PTAT current is proportional to a temperature, a level of the PTAT voltage VPTAT may also be proportional to a temperature. The process in which the PTAT current generator 222 generates the PTAT current and the PTAT voltage VPTAT will be more specifically described with reference to FIGS. 3 and 4.

The CTAT current generator 224 may receive the current IBGRn and the current IPTRn from the second mirroring current generator 223. The CTAT current generator 224 may generate a CTAT current having a level inversely proportional to a temperature, based on the current IBGRn and the current IPTRn. For example, the CTAT current generator 224 may use the current IBGRn and the current IPTRn as a reference current.

The CTAT current generator 224 may generate a CTAT voltage VCTAT having a level proportional to a level of the CTAT current. Since a level of the CTAT current is inversely proportional to a temperature, a level of the CTAT voltage VCTAT may also be inversely proportional to a temperature. The process in which the CTAT current generator 224 generates the CTAT current and the CTAT voltage VCTAT will be more specifically described with reference to FIGS. 3 and 4.

The PTAT and CTAT current generators 222 and 224 may receive the currents IBGRm, IPTRm, IBGRn, and IPTRn from the mirroring current generators 221 and 223 that are different from each other. The mirroring current generators 221 and 223 may have different mirroring ratios "1:m" and "1:n". In this case, a value of "m" may be different from a value of "n".

In an example of FIG. 2, levels of the current IBGRm and the current IPTRm may be proportional to "m", and levels of the current IBGRn and the current IPTRn may be proportional to "n". A level of the PTAT current may be proportional to "m", and a level of the CTAT current may be proportional to "n". Also, a level of the PTAT current may be proportional to a temperature, and a level of the CTAT current may be inversely proportional to a temperature. Accordingly, the rate of change of a level of the PTAT current with respect to temperature may be proportional to "m", and the rate of change of a level of the CTAT current with respect to temperature may be inversely proportional to "n". Also, the rate of change of a level of the PTAT current with respect to temperature may be proportional to the rate of change of a level of the current IPTRm with respect to temperature. The rate of change of a level of the CTAT current with respect to temperature may be inversely proportional to the rate of change of a level of the current IPTRn with respect to temperature.

A level of the PTAT voltage VPTAT may be proportional to a level of the PTAT current, and a level of the CTAT voltage VCTAT may be proportional to a level of the CTAT current. Accordingly, the rate of change of a level of the PTAT voltage VPTAT with respect to temperature may be proportional to "m", and the rate of change of a level of the CTAT voltage VCTAT with respect to temperature may be inversely proportional to "n".

Accordingly, a designer may design a current slope generator 220 so as to generate the PTAT current, the PTAT voltage VPTAT, the CTAT current, and the CTAT voltage VCTAT having the various rates of change with respect to temperature through various setting of different mirroring ratios "1:m" and "1:n".

In the example of FIG. 2, operations of the remaining elements other than the first mirroring current generator 221 and the second mirroring current generator 223 are the same as described with reference to FIG. 1, and thus, a description thereof will not be repeated here.

Figure 3:
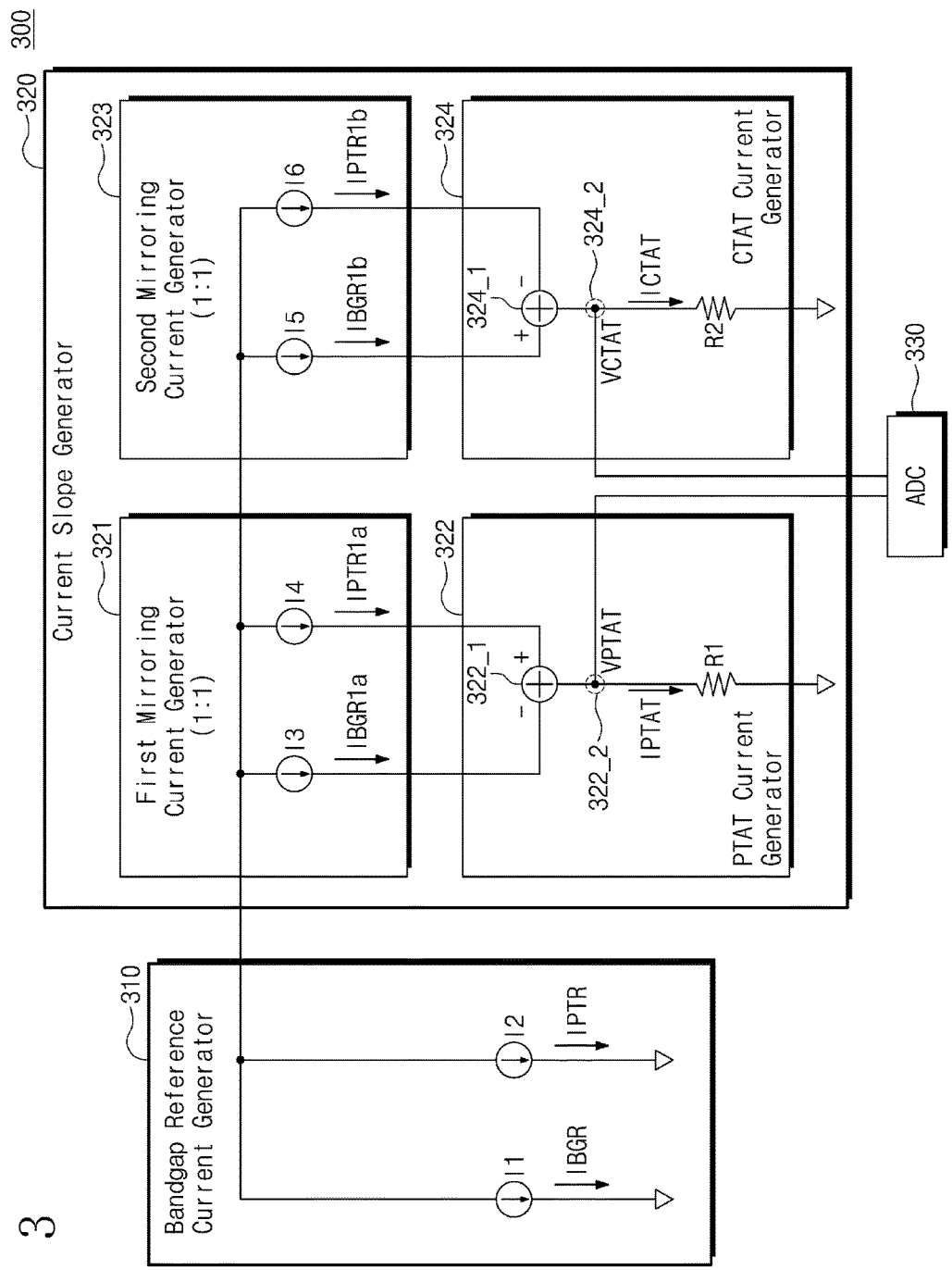
FIG. 3 is a circuit diagram illustrating an exemplary configuration of the temperature sensor of FIG. 2 according to example embodiments.

FIG. 3 is a circuit diagram illustrating an exemplary configuration of a temperature sensor of FIG. 2 according to example embodiments.

Referring to FIG. 3, a temperature sensor 300 may include a bandgap reference current generator 310, a current slope generator 320, and an ADC 330. The current slope generator 320 may include a first mirroring current generator 321, a PTAT current generator 322, a second mirroring current generator 323, and a CTAT current generator 324.

Referring to FIGS. 2 and 3, the temperature sensor 200 of FIG. 2 may include the temperature sensor 300 of FIG. 3. The bandgap reference current generator 210 of FIG. 2 may include the bandgap reference current generator 310 of FIG. 3. The first mirroring current generator 221 of FIG. 2 may include the first mirroring current generator 321 of FIG. 3. The PTAT current generator 222 of FIG. 2 may include the PTAT current generator 322 of FIG. 3. The second mirroring current generator 223 of FIG. 2 may include the second mirroring current generator 323 of FIG. 3. The CTAT current generator 224 of FIG. 2 may include the CTAT current generator 324 of FIG. 3. The ADC 330 of FIG. 3 may be the ADC 230 of FIG. 2.

The bandgap reference current generator 310 may include electronic circuits for generating the bandgap reference current IBGR and the temperature proportional reference current IPTR. The electronic circuits for generating the bandgap reference current IBGR may be modeled as a current source I1. The electronic circuits for the temperature proportional reference current IPTR may be modeled by a current source I2.

The current source I1 and the current source I2 may be connected with an equipotential terminal. The equipotential terminal may receive a specific voltage. For example, the equipotential terminal may be a ground terminal. The current source I1 may output the bandgap reference current IBGR to the first mirroring current generator 321 and the second mirroring current generator 323. The current source I2 may output the temperature proportional reference current IPTR to the first mirroring current generator 321 and the second mirroring current generator 323.

As described with reference to FIG. 2, the first mirroring current generator 321 may have a mirroring ratio of 1:m. Below, the first mirroring current generator 321 having a mirroring ratio of 1:1 will be described with reference to FIG. 3.

The first mirroring current generator 321 may receive the bandgap reference current IBGR and the temperature proportional reference current IPTR from the bandgap reference current generator 310. The first mirroring current generator 321 may include electronic circuits for mirroring the bandgap reference current IBGR and the temperature proportional reference current IPTR. For example, the electronic circuits of the first mirroring current generator 321 may include a current mirror circuit. The electronic circuits of the first mirroring current generator 321 may be modeled by a current source I3 and a current source I4. The current source I3 may output a mirrored current IBGR1a to the PTAT current generator 322 based on the bandgap reference current IBGR. The current source I4 may output a mirrored current IPTR1a to the PTAT current generator 322 based on the temperature proportional reference current IPTR.

The PTAT current generator 322 may include an adder 322_1 and a first resistor R1. The first resistor R1 may be connected between the adder 322_1 and an equipotential terminal (e.g., a ground terminal). The adder 322_1 may receive the mirrored current IBGR1a and the mirrored current IPTR1a from the first mirroring current generator 321. The adder 322_1 may output a PTAT current IPTAT, which has a level obtained by subtracting a level of the mirrored current IBGR1a from a level of the mirrored current IPTR1a, to the first resistor R1. The adder 322_1 may include an electronic circuit such as a current mirror circuit. A configuration and an operation of the adder 322_1 will be more specifically described with reference to FIG. 4.

As the PTAT current IPTAT flows to the equipotential terminal through the first resistor R1, the PTAT voltage VPTAT may be formed between two terminals of the first resistor R1. The PTAT voltage VPTAT may have a level corresponding to a product of a level of the PTAT current IPTAT and a value of the first resistor R1. Accordingly, a level of the PTAT voltage VPTAT may be proportional to a level of the PTAT current IPTAT.

As described with reference to FIG. 2, a mirroring ratio of the second mirroring current generator 323 may be 1:n. Below, the second mirroring current generator 323 having a mirroring ratio of 1:1 will be described with reference to FIG. 3.

The second mirroring current generator 323 may receive the bandgap reference current IBGR and the temperature proportional reference current IPTR from the bandgap reference current generator 310. The second mirroring current generator 323 may include electronic circuits for mirroring the bandgap reference current IBGR and the temperature proportional reference current IPTR. For example, the electronic circuit of the second mirroring current generator 323 may include a current mirror circuit. The electronic circuits may be modeled by a current source I5 and a current source I6. The current source I5 may output a mirrored current IBGR1b to the CTAT current generator 324 based on the bandgap reference current IBGR. The current source I6 may output a mirrored current IPTR1b to the CTAT current generator 324 based on the temperature proportional reference current IPTR.

The CTAT current generator 324 may include an adder 324_1 and a second resistor R2. The second resistor R2 may be connected between the adder 324_1 and the equipotential terminal (e.g., a ground terminal). The adder 324_1 may receive the mirrored current IBGR1b and the mirrored current IPTR1b from the second mirroring current generator 323. The adder 324_1 may output a CTAT current ICTAT, which has a level obtained by subtracting a level of the mirrored current IPTR1b from a level of the current IBGR1b, to the second resistor R2. The adder 324_1 may include an electronic circuit such as a current mirror circuit. A configuration and an operation of the adder 324_1 will be more specifically described with reference to FIG. 4.

As the CTAT current ICTAT flows to the equipotential terminal through the second resistor R2, the CTAT voltage VCTAT may be formed between two terminals of the second resistor R2. A level of the CTAT voltage VCTAT may have a value corresponding to a product of a level of the CTAT current ICTAT and a value of the second resistor R2. Accordingly, a level of the CTAT voltage VCTAT may be proportional to a level of the CTAT current ICTAT.

The ADC 330 may receive the PTAT voltage VPTAT from the PTAT current generator 322 and may receive the CTAT voltage VCTAT from the CTAT current generator 324. An operation of the ADC 330 of FIG. 3 is similar to the operation of the ADC 130 of FIG. 1, and thus, a description thereof will not be repeated here.

Referring to FIGS. 1 and 3, the temperature sensor 100 of FIG. 1 may include the temperature sensor 300 of FIG. 3.

However, the temperature sensor 100 of FIG. 1 may include one of the first mirroring current generator 321 and the second mirroring current generator 323. For example, in the case where the temperature sensor 100 of FIG. 1 includes the first mirroring current generator 321, the adder 324_1 may receive the mirrored currents IBGR1a and IPTR1a. Also, the CTAT current generator 324 may generate and output the CTAT current ICTAT and the CTAT voltage VCTAT through the above-described process based on the mirrored currents IBGR1a and IPTR1a.

Figure 4:
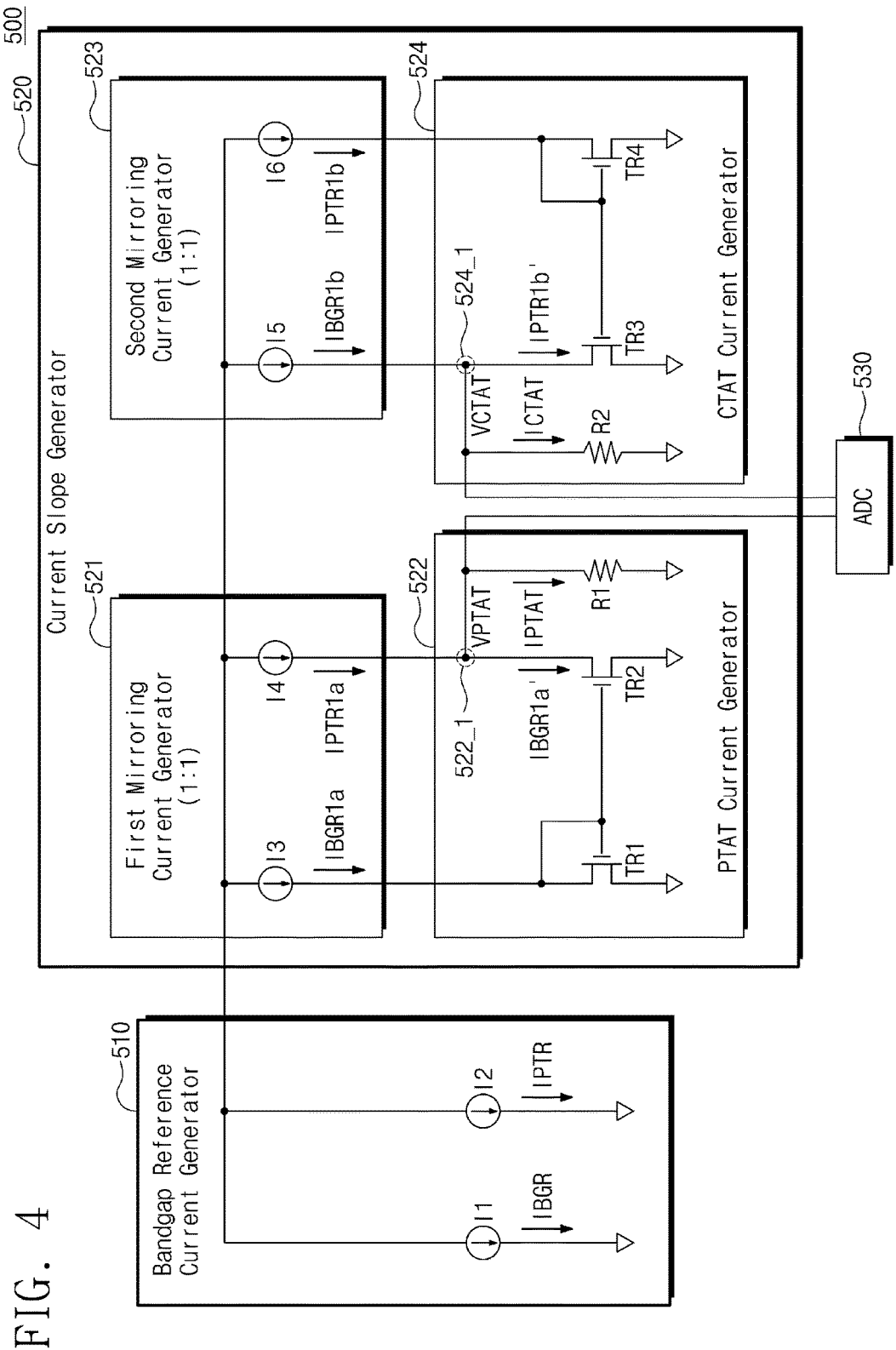
FIG. 4 is a circuit diagram illustrating an exemplary configuration of the temperature sensor of FIG. 2 according to example embodiments.

FIG. 4 is a circuit diagram illustrating an exemplary configuration of a temperature sensor of FIG. 2 according to example embodiments.

Referring to FIG. 4, a temperature sensor 500 may include a bandgap reference current generator 510, a current slope generator 520, and an ADC 530. The current slope generator 520 may include a first mirroring current generator 521, a PTAT current generator 522, a second mirroring current generator 523, and a CTAT current generator 524.

Operations and configurations of the bandgap reference current generator 510, the first mirroring current generator 521, the PTAT current generator 522, the second mirroring current generator 523, the CTAT current generator 524, and the ADC 530 of FIG. 4 are similar to the operations and configurations of the bandgap reference current generator 310, the first mirroring current generator 321, the PTAT current generator 322, the second mirroring current generator 323, the CTAT current generator 324, and the ADC 330 of FIG. 3, and thus, a description thereof will not be repeated here. Below, configurations and operations of the PTAT current generator 522 and the CTAT current generator 524 will be more specifically described with reference to FIG. 4.

The PTAT current generator 322 of FIG. 3 may include the PTAT current generator 522 of FIG. 4. The PTAT current generator 522 may include a first transistor TR1, a second transistor TR2, and a first resistor R1. The adder 322_1 of FIG. 3 may include the first transistor TR1 and the second transistor TR2 of FIG. 4.

A first end of the first transistor TR1 may receive the mirrored current IBGR1a from the first mirroring current generator 521. Also, the first end of the first transistor TR1 may be connected with a gate terminal of the first transistor TR1. A second end of the first transistor TR1 may be connected to an equipotential terminal (e.g., a ground terminal). The gate terminal of the first transistor TR1 may be connected to a gate terminal of the second transistor TR2. A first end of the second transistor TR2 may be connected to a node 522_1. A second end of the second transistor TR2 may be connected to the equipotential terminal. The first resistor R1 may be connected between the node 522_1 and the equipotential terminal.

The first transistor TR1 and the second transistor TR2 may constitute a current mirror circuit. The current mirror circuit that is composed of the first transistor TR1 and the second transistor TR2 may have a mirroring ratio. The first transistor TR1 and the second transistor TR2 may output a current IBGR1a' having a level proportional to a level of the mirrored current IBGR1a. In the case where the mirroring ratio of the current mirror circuit is 1:1, the current IBGR1a' that has substantially the same level as a level of the mirrored current IBGR1a input to the first transistor TR1 may flow through the second transistor TR2.

As the current IBGR1a' flows through the second transistor TR2, the PTAT current IPTAT may flow through the first resistor R1 connected between the current mirror circuit and the equipotential terminal. For example, the first resistor R1 may allow the PTAT current IPTAT to flow to the equipotential terminal. Accordingly, the PTAT current IPTAT may have a level obtained by subtracting a level of the current IBGR1a' from a level of the mirrored current IPTR1a. Since a level of the current IBGR1a' is substantially the same as a level of the mirrored current IBGR1a, a level of the PTAT current IPTAT may correspond to a level obtained by subtracting a level of the mirrored current IBGR1a from a level of the mirrored current IPTR1a.

As the PTAT current IPTAT flows through the first resistor R1, the PTAT voltage VPTAT may be formed between two nodes of the first resistor R1. A level of the PTAT voltage VPTAT may have a value corresponding to a product of a level of the PTAT current IPTAT and a value of the first resistor R1. As described with reference to FIG. 1, a level of the PTAT voltage VPTAT may be proportional to a temperature.

The CTAT current generator 324 of FIG. 3 may include the CTAT current generator 524 of FIG. 4. The CTAT current generator 524 may include a third transistor TR3, a fourth transistor TR4, and a second resistor R2. The adder 324_1 of FIG. 3 may include the third transistor TR3 and the fourth transistor TR4 of FIG. 4.

A first end of the third transistor TR3 may be connected to a node 524_1. A second end of the third transistor TR3 may be connected to the equipotential terminal. The second resistor R2 may be connected between the node 524_1 and the equipotential terminal. A first end of the fourth transistor TR4 may receive the mirrored current IPTR1b from the second mirroring current generator 523. Also, the first end of the fourth transistor TR4 may be connected to a gate terminal of the fourth transistor TR4. A second end of the fourth transistor TR4 may be connected to the equipotential terminal. The gate terminal of the fourth transistor TR4 may be connected to a gate terminal of the third transistor TR3.

The third transistor TR3 and the fourth transistor TR4 may constitute a current mirror circuit. The current mirror circuit that is composed of the third transistor TR3 and the fourth transistor TR4 may have a mirroring ratio. The third transistor TR3 and the fourth transistor TR4 may output a current IPTR1b' having a level proportional to a level of the mirrored current IPTR1b. In the case where the mirroring ratio of the current mirror circuit is 1:1, the current IPTR1b' that has substantially the same level as a level of the mirrored current IPTR1b input to the fourth transistor TR4 may flow through the third transistor TR3.

As the current IPTR1b' flows through the third transistor TR3, the CTAT current ICTAT may flow to the second resistor R2 connected between the current mirror circuit and the equipotential terminal. For example, the second resistor R2 may allow the CTAT current ICTAT to flow to the equipotential terminal. Accordingly, the CTAT current ICTAT may have a level obtained by subtracting a level of the current IPTR1b' from a level of the mirrored current IBGR1b. Since a level of the current IPTR1b' is substantially the same as a level of the mirrored current IPTR1b, a level of the CTAT current ICTAT may correspond to a level obtained by subtracting a level of the mirrored current IPTR1b from a level of the mirrored current IBGR1b.

As the CTAT current ICTAT flows through the second resistor R2, the CTAT voltage VCTAT may be formed between two nodes of the second resistor R2. The CTAT voltage VCTAT may have a level corresponding to a product of a level of the CTAT current ICTAT and a value of the second resistor R2. Accordingly, as described with reference to FIG. 1, a level of the CTAT voltage VCTAT may be inversely proportional to a temperature.

An embodiment in which a mirroring ratio of a current mirror included in the PTAT current generator 522 and a current mirror included in the CTAT current generator 524 is 1:1 is described with reference to FIG. 4. However, each of the PTAT current generator 522 and the CTAT current generator 524 of the inventive concept may include all embodiments of a current mirror having any mirroring ratio.

As described with reference to FIG. 1, a level of the temperature proportional reference current IPTR may be proportional to a temperature. Accordingly, levels of the currents IPTR1a, IPTR1a', IPTAT, IPTR1b, and IPTR1b' may be proportional to a temperature. Also, since a level of the current IPTR1b' is proportional to a temperature, a level of the current ICTAT may be inversely proportional to a temperature.

For example, in the case where a mirroring ratio of a current mirror circuit included in the PTAT current generator 522 is 1:x, a level of the current IPTAT may be proportional to "x". Accordingly, the rate of change of a level of the current IPTAT with respect to temperature may be proportional to "x". In the case where a mirroring ratio of a current mirror circuit included in the CTAT current generator 524 is 1:y, a level of the current ICTAT may be proportional to "y". Accordingly, the rate of change of a level of the current ICTAT with respect to temperature may be inversely proportional to "y".

Accordingly, a designer may design the current slope generator 520 so as to generate the PTAT current IPTAT, the PTAT voltage VPTAT, the CTAT current ICTAT, and the CTAT voltage VCTAT having the various rates of change with respect to temperature through setting of the mirroring ratios "1:x" and "1:y".

Referring to FIGS. 1 and 4, the temperature sensor 100 of FIG. 1 may include the temperature sensor 500 of FIG. 4. However, the temperature sensor 100 of FIG. 1 may include one of the first mirroring current generator 521 and the second mirroring current generator 523. For example, in the case where the temperature sensor 100 of FIG. 1 includes the first mirroring current generator 521, the CTAT current generator 524 may receive the mirrored current IBGR1a from the first mirroring current generator 521 instead of the mirrored current IBGR1b. Also, the CTAT current generator 524 may receive the mirrored current IPTR1a from the first mirroring current generator 521 instead of the mirrored current IPTR1b. Through the above-described process, the CTAT current generator 524 may generate the CTAT current ICTAT and the CTAT voltage VCTAT based on the mirrored currents IBGR1a and IPTR1a.

Figure 5:
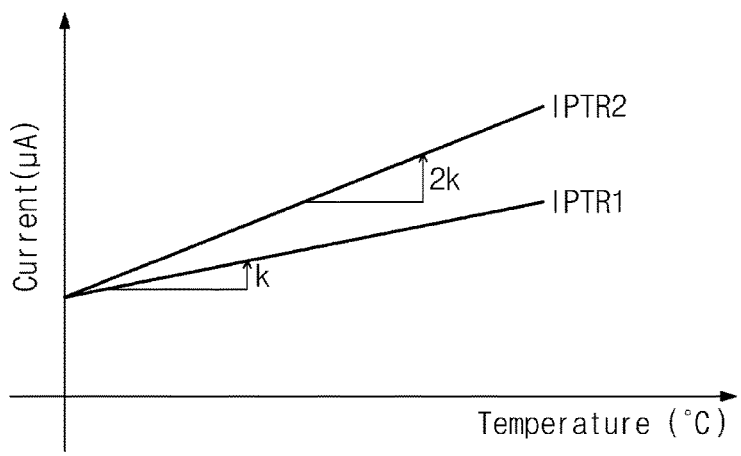
FIG. 5 is a graph illustrating exemplary currents generated by the temperature sensor of FIG. 2 depending on a temperature.

FIG. 5 is a graph illustrating exemplary currents generated by a temperature sensor of FIG. 2 depending on a temperature. In the graph of FIG. 5, an x-axis denotes a temperature of a ° C. unit, and a y-axis denotes a level of a current of a μA unit.

As described with reference to FIG. 2, a mirroring ratio of the mirroring current generator 221 may be 1:m. Below, a current IPTR2 mirrored by a ratio of 1:2 and a mirrored current IPTR1 mirrored by a ratio of 1:1 will be described with reference to FIG. 5.

As described with reference to FIG. 2, current slopes of the mirrored currents IPTR1 and IPTR2 may be proportional to a temperature (i.e., a temperature variation). For example, an amount of current increases as the temperature of an electronic device is increased. Accordingly, the rate of change "2k" of a level of the mirrored current IPTR2 with respect to temperature may be two times the rate of change "k" of a level of the mirrored current IPTR1 with respect to temperature.

For example, a level of the mirrored current IPTR1 may be I1 at a first temperature T1 and a level of the mirrored current IPTR1 may be I2 greater than the I1 at a second temperature T2 higher than the first temperature T1. Also, a level of the mirrored current IPTR2 may be 2I1 at first temperature T1 and a level of the mirrored current IPTR2 may be 2I2 at the second temperature T2.

When the mirrored currents IPTR1 and IPTR2 are generated by the first mirroring current generator 221, the mirrored currents IPTR1 and IPTR2 may include an error component. In the process where the temperature reference current IPTR is mirrored, the error component may be also amplified depending on a mirroring ratio. Accordingly, the error component included in the mirrored currents IPTR1 and IPTR2 may have a magnitude that is determined depending on the mirroring ratio of the mirroring current generator 221. Accordingly, the magnitude of the error component included in the current IPTR2 may be two times the magnitude of the error component included in the mirrored current IPTR1. That is, an error included in a mirrored current may become greater as the mirroring ratio becomes greater. The error component may include a process, voltage, and temperature (PVT) variation. Thus, the electronic circuits such as a temperature sensor may be more sensitive to the PVT variation as the error component becomes greater.

Also, a power consumption of the first mirroring current generator 221 of FIG. 2 upon generating the mirrored current IPTR2 may be greater than that upon generating the mirrored current IPTR1.

Figure 6:
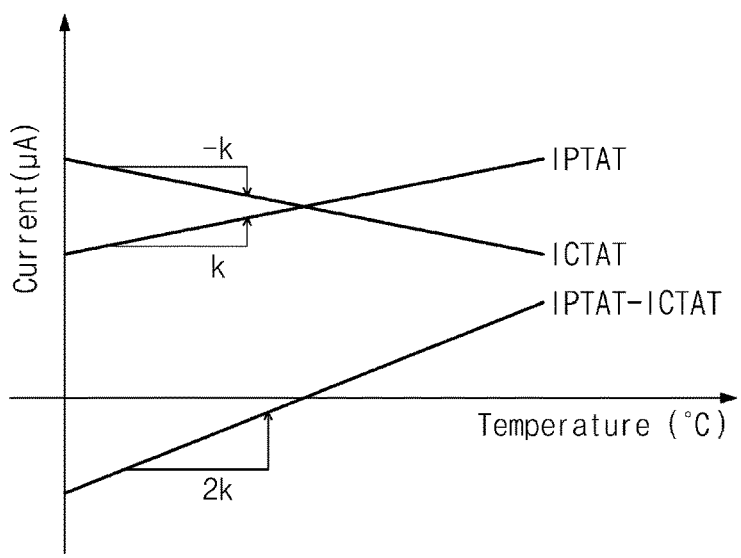
FIG. 6 is a graph illustrating exemplary currents generated by the temperature sensor of FIG. 2 depending on a temperature according to example embodiments.

FIG. 6 is a graph illustrating exemplary currents generated by a temperature sensor of FIG. 2 depending on a temperature. In the graph of FIG. 6, an x-axis denotes a temperature of a ° C. unit, and a y-axis denotes a level of a current of a μA unit.

Below, the PTAT current IPTAT and the CTAT current ICTAT when a mirroring ratio of current mirror circuits included in the first mirroring current generator 221, the second mirroring current generator 223, the PTAT current generator 222, and the CTAT current generator 224 of FIG. 2 is 1:1 will be described with reference to FIG. 6.

Referring to FIG. 6, a level of the PTAT current IPTAT may be proportional to a temperature, and a level of the CTAT current ICTAT may be inversely proportional to a temperature. A level obtained by subtracting a level of the CTAT current ICTAT from a level of the PTAT current IPTAT may be proportional to a temperature.

In an example of FIG. 6, a sign of the rate of change of a level of the PTAT current IPTAT with respect to temperature may be different from a sign of the rate of change of a level of the CTAT current ICTAT with respect to temperature. For example, the rate of change of a level of the PTAT current IPTAT with respect to temperature may be "k", and the rate of change of a level of the CTAT current ICTAT with respect to temperature may be "−k" (here, "k" being a positive number). The rate of change of a level, which is obtained by subtracting a level of the CTAT current ICTAT from a level of the PTAT current IPTAT, with respect to temperature may be "2 k".

As described with reference to FIGS. 3 and 4, the PTAT current IPTAT and the CTAT current ICTAT may correspond to the PTAT voltage VPTAT and the CTAT voltage VCTAT, respectively. A level of the PTAT voltage VPTAT and a level of the CTAT voltage VCTAT may be proportional to a level of the PTAT current IPTAT and a level of the CTAT current ICTAT, respectively. A value obtained by subtracting a level of the CTAT voltage VCTAT from a level of the PTAT voltage VPTAT may be proportional to a value obtained by subtracting a level of the CTAT current ICTAT from a level of the PTAT current IPTAT.

Accordingly, the rate of change of a level of the PTAT voltage VPTAT with respect to temperature may be proportional to "k". The rate of change of a level of the CTAT voltage VCTAT with respect to temperature may be proportional to "−k". The rate of change of a level obtained by subtracting a level of the CTAT voltage VCTAT from a level of the PTAT voltage VPTAT may be proportional to "2 k".

As the rates of change of the PTAT voltage VPTAT and the CTAT voltage VCTAT are small, a level of the PTAT voltage VPTAT and a level of the CTAT voltage VCTAT may change small with respect to a specific temperature change. As a level of the PTAT voltage VPTAT and a level of the CTAT voltage VCTAT change small with respect to a specific temperature change, a least significant bit (LSB) of a code value output by an ADC may correspond to a level of a smaller voltage. The ADC may generate a code value based on a voltage having a rate of change "2 k" with respect to temperature by subtracting a level of the CTAT voltage VCTAT from a level of the PTAT voltage VPTAT. Accordingly, the sensitivity of the ADC may become higher. The ADC may include more electronic circuits as the sensitivity of the ADC become higher. As the ADC includes more electronic circuits, the ADC may consume more power and may be disposed on wider area.

In example embodiments, as a level of the PTAT voltage VPTAT and a level of the CTAT voltage VCTAT change a small amount with respect to a specific temperature change, an area, a PVT variation, and a power consumption of each of the mirroring current generators 221, 223, 321, 323, 521, and 523 may be reduced.

The ADC may generate a code value by using a voltage generated based on the PTAT current IPTAT. For example, as the PTAT current IPTAT flows through a first resistor R1, a voltage VPTAT may be formed between two terminals of the first resistor R1. The ADC may receive the voltage VPTAT and may generate a code value based on the voltage VPTAT. A level of the voltage VPTAT may be proportional to a level of the current IPTAT. The level of the voltage VPTAT may be a product of the level of the current IPTAT and a value of the resistor R1.

As described with reference to FIG. 5, the rate of change of the current IPTRm when "m" is 1, that is, the rate of change of a level of the mirrored current IPTR1 may be "k". A rate of change of the voltage VPTAT with temperature may be proportional to "k". As described above, a rate of change of a value obtained by subtracting a level of the CTAT voltage VCTAT from a level of the PTAT voltage VPTAT may be proportional to "2 k".

The sensitivity of the ADC using a voltage having the rate of change with respect to temperature being "2 k" may be higher than the sensitivity of the ADC using a voltage having the rate of change with respect to temperature being "k". The sensitivity of the ADC that outputs a code value based on a value obtained by subtracting a level of the CTAT voltage VCTAT from a level of the PTAT voltage VPTAT may be higher than the sensitivity of the ADC that outputs a code value based on a level of the voltage having the rate of change with respect to temperature being "k".

Accordingly, the power consumption and areas of the ADC 130 of FIG. 1, the ADC 230 of FIG. 2, the ADC 330 of FIG. 3 and the ADC 530 may be smaller than those of an ADC that generates a code value based on the voltage having the rate of change with respect to temperature being "k".

Referring to FIGS. 5 and 6, the rate of change "2 k" with respect to temperature that a value obtained by subtracting a level of the CTAT current ICTAT from a level of the PTAT current IPTAT of FIG. 6 has may be the same as the rate of change "2 k" of the current IPTR2 with respect to temperature of FIG. 5. A mirroring ratio of the mirroring current generator 221 for generating the current IPTR2 of FIG. 5 may be "1:2". However, a mirroring ratio of the mirroring current generator 221 for generating the PTAT current IPTAT and the CTAT current ICTAT of FIG. 6 may be "1:1".

As described with reference to FIG. 5, the magnitude of an error component included in a mirrored current may correspond to a mirroring ratio of the mirroring current generator 221. Accordingly, the magnitude of the error component included in the PTAT current IPTAT and the CTAT current ICTAT of FIG. 6 may be smaller than the magnitude of the error component included in the current IPTR2 of FIG. 5. Accordingly, the magnitude of the error component included in a value obtained by subtracting the CTAT current ICTAT from the PTAT current IPTAT of FIG. 6 may be smaller than the magnitude of the error component included in the current IPTR2 of FIG. 5. For example, in the case where a designer uses the PTAT current generator 222 and the CTAT current generator 224, the magnitude of an error component included in a current output from the current slope generator 220 may decrease.

The case where a mirroring ratio of current mirror circuits included in the first mirroring current generator 221, the second mirroring current generator 223, the PTAT current generator 222, and the CTAT current generator 224 of FIG. 2 is 1:1 is described with reference to FIG. 6. However, the inventive concept may include the first mirroring current generator 221 of which a mirroring ratio is 1:m, the second mirroring current generator 223 of which a mirroring ratio is 1:n, the PTAT current generator 222 of which a mirroring ratio is 1:x, and the CTAT current generator 224 of which a mirroring ratio is 1:y. Accordingly, the rate of change of a level, which is obtained by subtracting a level of the CTAT current ICTAT from a level of the PTAT current IPTAT, with respect to temperature may be proportional to the PTAT current IPTAT with any ratio. Each of the x and y may be a positive integer greater than 1.

Figure 7:
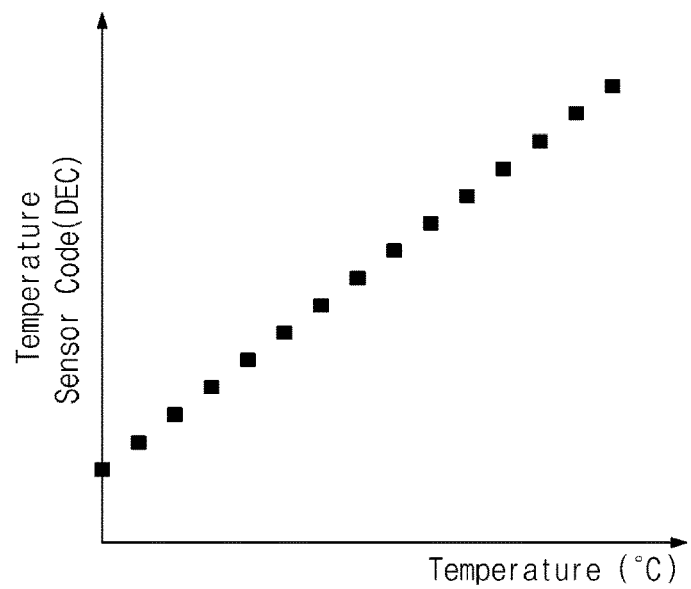
FIG. 7 is a graph illustrating exemplary code values generated by an analog to digital converter of FIG. 1 depending on a temperature.

FIG. 7 is a graph illustrating exemplary code values generated by an ADC of FIG. 1 depending on a temperature. In the graph of FIG. 7, an x-axis denotes a temperature of a ° C. unit, and a y-axis denotes a level of a current of a decimal (DEC) unit.

Referring to FIGS. 4, 6, and 7, the PTAT voltage VPTAT corresponding to the PTAT current IPTAT of FIG. 6 may be generated by the first resistor R1 of FIG. 4. Also, the CTAT voltage VCTAT corresponding to the CTAT current ICTAT of FIG. 6 may be generated by the second resistor R2 of FIG. 4. For example, a level of the PTAT voltage VPTAT may be proportional to a level of the PTAT current IPTAT, and a level of the CTAT voltage VCTAT may be proportional to a level of the CTAT current ICTAT. As described with reference to FIG. 4, the ADC 530 may generate code values based on the PTAT voltage VPTAT and the CTAT voltage VCTAT. Accordingly, the code values of FIG. 7 may be proportional to a temperature.

In an example of FIG. 7, intervals between adjacent code values may be substantially the same. The intervals between adjacent code values may correspond to a specific temperature interval. Accordingly, each code value may correspond to a specific temperature.

FIG. 8 is a block diagram illustrating an exemplary electronic device including a temperature sensor of FIG. 1 according to example embodiments.

Referring to FIG. 8, an electronic device 1000 may include a processor 1100, a memory 1200, storage 1300, a temperature sensor 1400, a communication device 1500, a user interface 1600, and a bus 1700. The electronic device 1000 may further include other elements (e.g., a power supply) that are not illustrated in FIG. 8. Alternatively, the electronic device 1000 may not include one or more of elements that are illustrated in FIG. 8.

The processor 1100 may control overall operations of the electronic device 1000. The processor 1100 may process data for controlling operations of the electronic device 1000. For example, the processor 1100 may calculate an internal temperature (or, an operating temperature) of the electronic device 1000 by using a code value output from the temperature sensor 1400. Alternatively, the processor 1100 may control overall operations of the electronic device 1000 by using a code value output from the temperature sensor 1400.

For example, the processor 1100 may be one of a general-purpose processor, a workstation processor, an application processor, etc. The processor 1100 may include a single processor core or may include a plurality of processor cores. For example, the processor 1100 may include a multi-core such as a dual-core, a quad-core, or a hexa-core.

The memory 1200 may store data processed or to be processed by the processor 1100. For example, the memory 1200 may include a volatile memory such as a static random access memory (SRAM), a dynamic RAM (DRAM), or a synchronous DRAM (SDRAM), or a nonvolatile memory such as a flash memory, a phase-change RAM (PRAM), a magneto-resistive RAM (MRAM), a resistive RAM (Re-RAM), or a ferro-electric RAM (FRAM). Alternatively, the memory 1200 may include heterogeneous memories. For example, the memory 1200 may store a code value generated by the temperature sensor 1400.

The storage 1300 may store data regardless of power supply. For example, the storage 1300 may be a storage medium, which includes a nonvolatile memory, such as a hard disk drive (HDD), a solid state drive (SSD), a secure digital (SD) card, or a universal serial bus (USB) memory device. For example, the storage 1300 may store a code value generated by the temperature sensor 1400.

The temperature sensor 1400 may detect a temperature of the electronic device 1000. The temperature sensor 1400 may include at least one of the temperature sensor 100 of FIG. 1, the temperature sensor 200 of FIG. 2, the temperature sensor 300 of FIG. 3, and the temperature sensor 500 of FIG. 4. The temperature sensor 1400 may output a code value corresponding to the temperature of the electronic device 1000. The output code value may be used to measure and improve the performance of the electronic device 1000.

The communication device 1500 may include a transmitter unit and a receiver unit. The electronic device 1000 may communicate with another electronic device through the communication device 1500 to transmit and/or receive data.

The user interface 1600 may convey an input/output of a command or data between the user and the electronic device 1000. For example, the user interface 1600 may include a physical device such as an input device and/or an output device. The input device may include a keyboard, a mouse, a touchscreen, a scanner, a joystick, a voice recognition device, a motion recognition device, or an eyeball recognition device, and the output device may include a monitor, a display device, a projector, a speaker, or a plotter.

The bus 1700 may provide a communication path between the elements of the electronic device 1000. For example, the processor 1100, the memory 1200, the storage 1300, the temperature sensor 1400, the communication device 1500, and the user interface 1600 may exchange data with each other through the bus 1700. The bus 1700 may be configured to support various types of communication formats used in the electronic device 1000.

In an example of FIG. 8, the temperature sensor 1400 is illustrated as being a separate block. However, the temperature sensor 1400 may be included in the processor 1100, the memory 1200, the storage 1300, the communication device 1500, and/or the user interface 1600.

According to an embodiment of the inventive concept, it may be possible to implement a temperature sensor that is capable of consuming less power and being disposed in a smaller area.

While the inventive concept has been described with reference to embodiments, it will be apparent to those skilled in the art that various changes and modifications may be made without departing from the spirit and scope of the following claims. Therefore, it should be understood that the above embodiments are not limiting, but illustrative.

What is claimed is:

1. An electronic device comprising:
a first current generator configured to output a first mirroring current and a second mirroring current, with respect to a temperature variation, the first mirroring current having a current slope proportional to a current slope of a first reference current and the second mirroring current having a current slope proportional to a current slope of a second reference current;
a second current generator configured to output a third mirroring current and a fourth mirroring current, with respect to the temperature variation, the third mirroring current having a current slope proportional to the current slope of the first reference current and the fourth mirroring current having a current slope proportional to the current slope of the second reference current;
a third current generator including a first current mirror configured to generate a fifth mirroring current having a current slope proportional to the current slope of the first mirroring current with respect to the temperature variation, the third current generator being configured to output a first current having a level of a value obtained by subtracting a level of the fifth mirroring current from a level of the second mirroring current; and
a fourth current generator including a second current mirror configured to generate a sixth mirroring current having a current slope proportional to the current slope of the fourth mirroring current with respect to the temperature variation, the fourth current generator being configured to output a second current having a level of a value obtained by subtracting a level of the sixth mirroring current from a level of the third mirroring current.

2. The electronic device of claim 1, wherein the current slope of the first mirroring current and the current slope of the third mirroring current are uniform and independent of the temperature variation.

3. The electronic device of claim 1, further comprising:
a reference current generator configured to generate the first reference current and the second reference current, wherein a level of the second reference current is proportional to a temperature.

4. The electronic device of claim 1, wherein a ratio of a level of the first reference current to a level of the first mirroring current is the same as a ratio of a level of the second reference current to a level of the second mirroring current.

5. The electronic device of claim 1, wherein a ratio of a level of the first reference current to the level of the third mirroring current is the same as a ratio of a level of the second reference current to a level of the fourth mirroring current.

6. The electronic device of claim 1, wherein the first current generator comprises:
a third current mirror configured to output the first mirroring current and the second mirroring current.

7. The electronic device of claim 1, wherein the first current mirror comprises:
a first transistor configured to receive the first mirroring current; and
a second transistor including a gate terminal connected to a gate terminal of the first transistor and configured to pass the fifth mirroring current.

8. The electronic device of claim 1, wherein the third current generator further includes a first resistor and the fourth current generator further includes a second resistor, and
wherein a first voltage is formed between two terminals of the first resistor as the first current flows through the first resistor, and a second voltage is formed between two terminals of the second resistor as the second current flows through the second resistor.

9. The electronic device of claim 8, wherein the first resistor is connected between the first current mirror and an equipotential terminal, and the second resistor is connected between the second current mirror and the equipotential terminal.

10. The electronic device of claim 8, further comprising:
an analog to digital converter (ADC) configured to output a code value based on the first voltage and the second voltage.

11. The electronic device of claim 10, wherein the code value corresponds to a value obtained by subtracting a level of the second voltage from a level of the first voltage.

12. The electronic device of claim 1, wherein a rate of change of the level of the first current with respect to temperature is proportional to a rate of change of the level of the second mirroring current with respect to temperature, and
wherein a rate of change of the level of the second current with respect to temperature is inversely proportional to a rate of change of the level of the fourth mirroring current with respect to temperature.

13. An electronic device comprising:
a first current generator configured to generate a first reference current and a second reference current;
a second current generator including a first current mirror configured to generate a first mirroring current having a current slope proportional to a current slope of the first reference current with respect to a temperature variation, the second current generator being configured to output a first current having a level of a value obtained by subtracting a level of the first mirroring current from a level of the second reference current; and
a third current generator including a second current mirror configured to generate a second mirroring current having a current slope proportional to the current slope of the second reference current with respect to the temperature variation, the third current generator being configured to output a second current having a level of a value obtained by subtracting a level of the second mirroring current from a level of the first reference current.

14. The electronic device of claim 13, wherein the current slope of the first mirroring current is the same as the current slope of the first reference current with respect to the temperature variation, and
wherein the current slope of the second mirroring current is the same as the current slope of the second reference current with respect to the temperature variation.

15. The electronic device of claim 13, wherein a rate of change of the level of the first current with respect to temperature is proportional to a rate of change of the level of the second reference current with respect to temperature, and
wherein a rate of change of the level of the second current with respect to temperature is inversely proportional to a rate of change of the level of the second reference current with respect to temperature.

16. An electronic device comprising:
a reference current generator configured to:
generate a first reference current, and
generate a second reference current having a current level proportional to a temperature; and
a current slope generator configured to:
with respect to a temperature variation, generate a first mirroring current having a current slope proportional to a current slope of the first reference current and a second mirroring current having a current slope proportional to the current slope of the second reference current,
generate a third mirroring current having a current slope proportional to the current slope of the first mirroring current,
output a first current having a level of a value obtained by subtracting a level of the third mirroring current from a level of the second mirroring current,
generate a fourth mirroring current having a current slope proportional to the current slope of the second mirroring current, and
output a second current having a level of a value obtained by subtracting a level of the fourth mirroring current from a level of the first mirroring current.

17. The electronic device of claim 16, wherein the current slope generator comprises:
a first current mirror configured to generate the third mirroring current;
a first resistor configured to allow the first current to flow to an equipotential terminal;
a second current mirror configured to generate the fourth mirroring current; and
a second resistor configured to pass the second current to the equipotential terminal,
wherein a first voltage is formed between two terminals of the first resistor as the first current passes through the first resistor, and a second voltage is formed between two terminals of the first resistor as the second current passes through the second resistor.

18. The electronic device of claim 17, further comprising:
an analog to digital converter (ADC) configured to output a code value based on a value obtained by subtracting a level of the second voltage from a level of the first voltage.

19. The electronic device of claim 17, wherein the first current mirror comprises:

a first transistor including a first terminal for receiving the first mirroring current and a second terminal connected to the equipotential terminal; and a second transistor including a gate terminal connected to a gate terminal of the first transistor, a first terminal connected to a first node, and a second terminal connected to the equipotential terminal, wherein the first resistor is connected between the first node and the equipotential terminal.

20. The electronic device of claim 19, wherein the second current mirror comprises:

a third transistor including a first terminal connected to a second node and a second terminal connected to the equipotential terminal; and a fourth transistor including a gate terminal connected to a gate terminal of the third transistor, a first terminal receiving the second mirroring current, and a second terminal connected to the equipotential terminal, wherein the second resistor is connected between the second node and the equipotential terminal.

* * * * *